Oct. 11, 1966                J. W. GERAGHTY ETAL                3,278,684
                          PRECISION TIMING OF PULSE SIGNALS
Filed Nov. 28, 1962                                         7 Sheets-Sheet 1
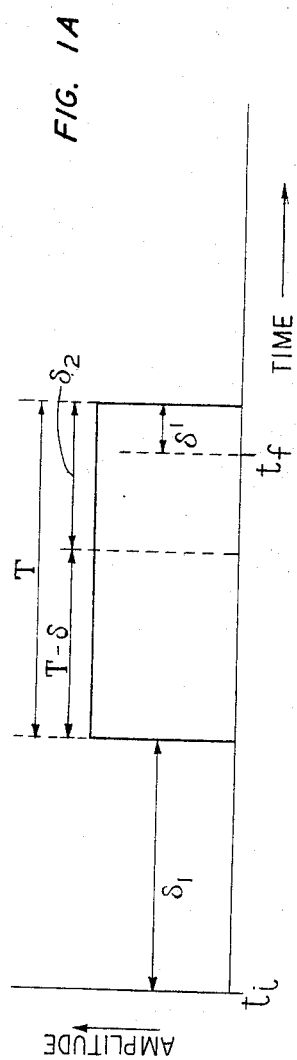
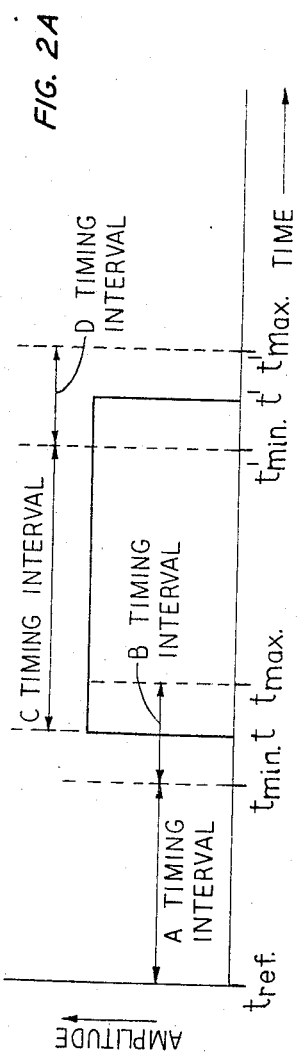
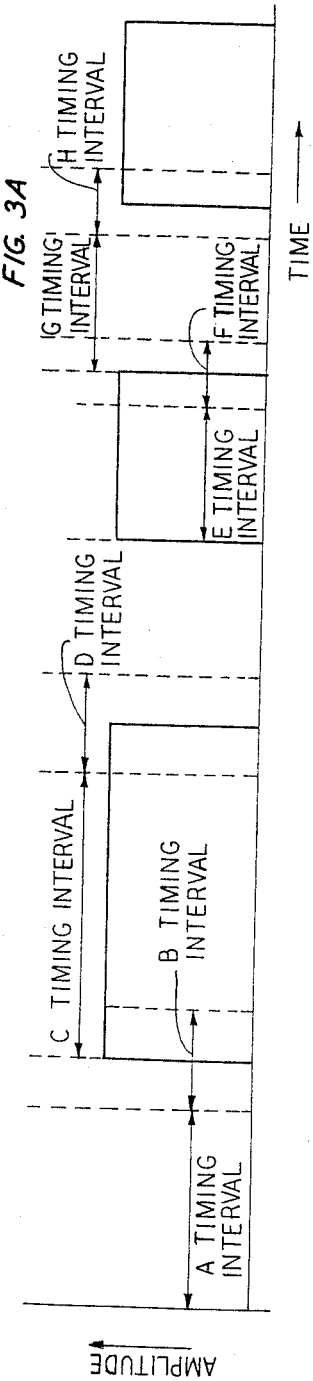
INVENTORS J. W. GERAGHTY
          J. R. SHINE
BY
          G. E. Kersey
                ATTORNEY

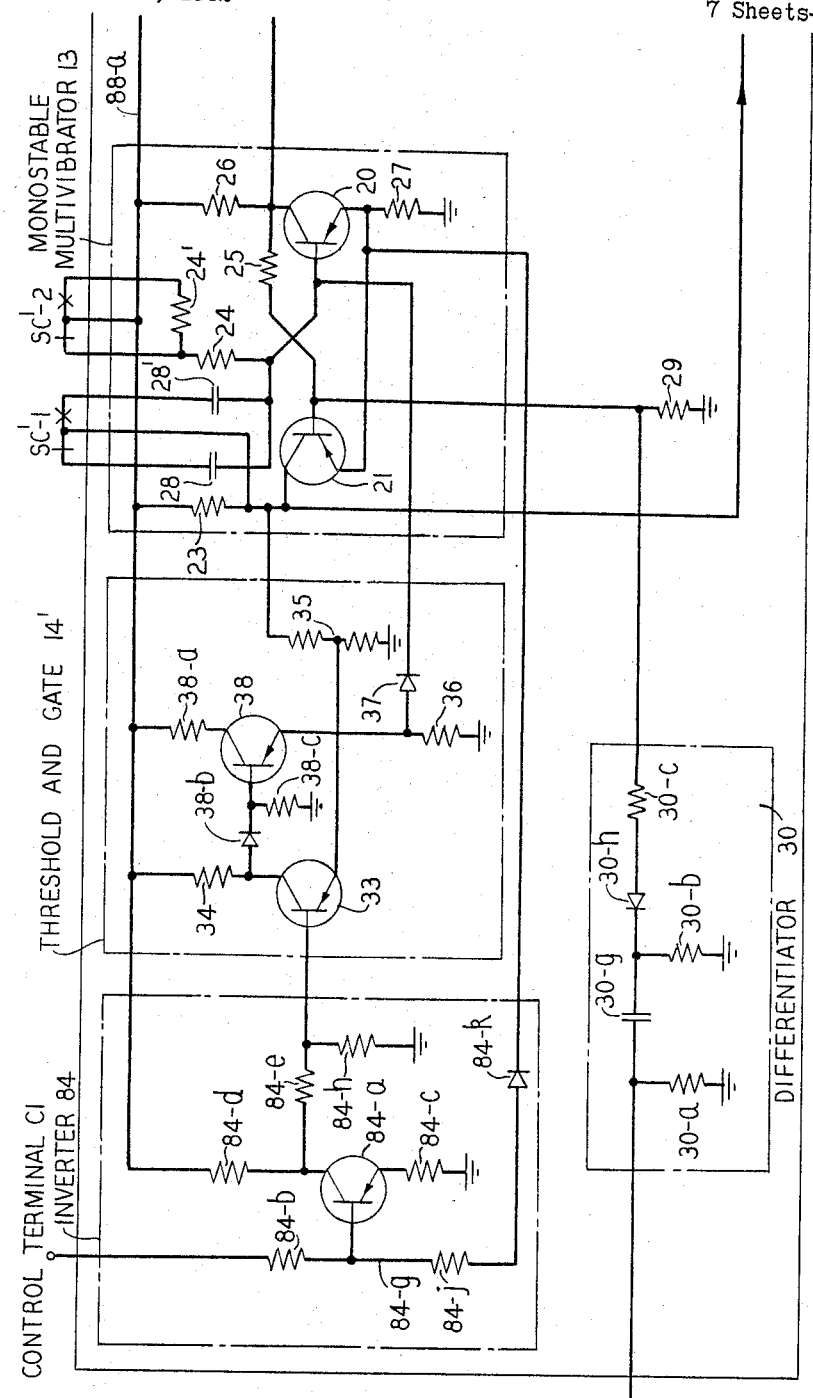

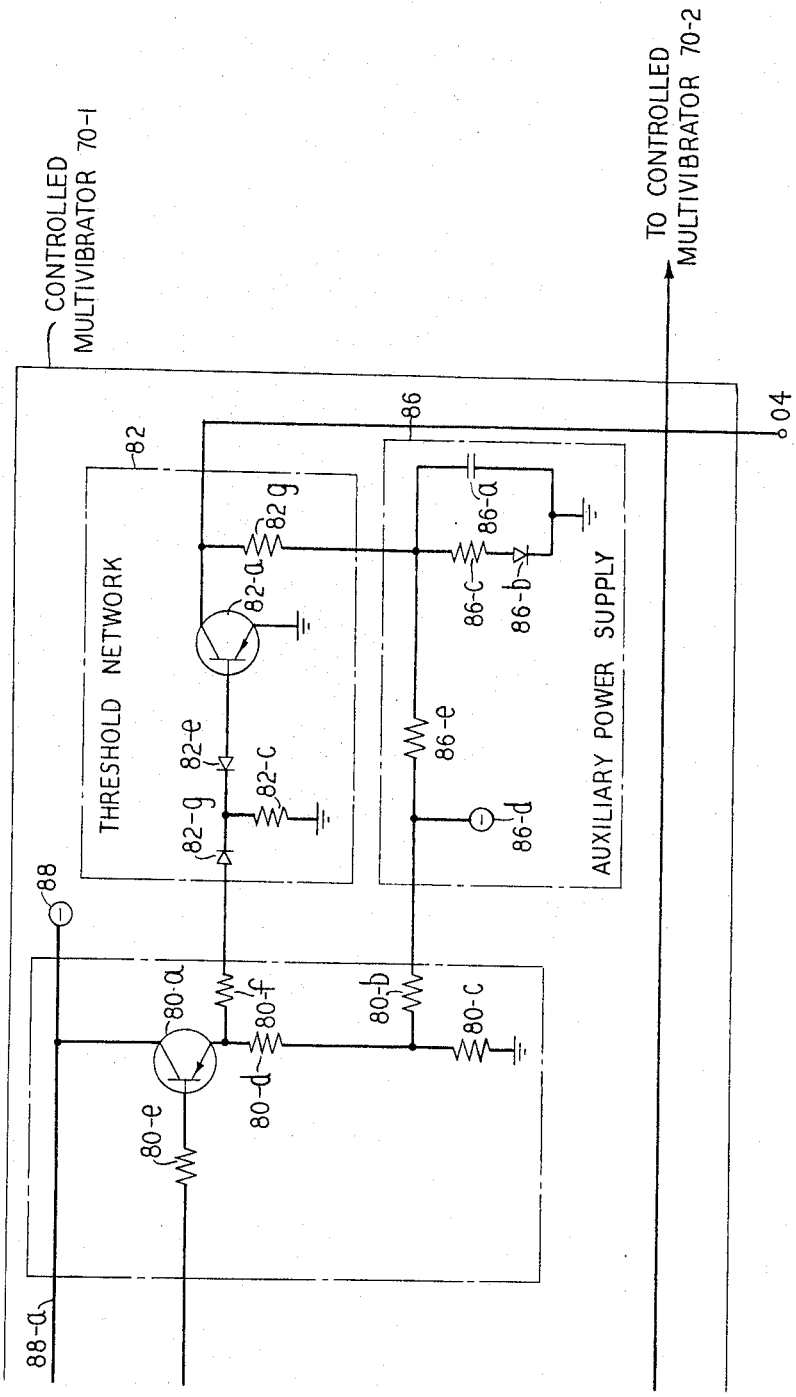

United States Patent Office 3,278,684
Patented Oct. 11, 1966

3,278,684
PRECISION TIMING OF PULSE SIGNALS
John W. Geraghty, Jamaica, and John R. Shine, Plainview, N.Y., assignors to Bell Telephone Laboratories, Incorporated, New York, N.Y., a corporation of New York
Filed Nov. 28, 1962, Ser. No. 240,654
11 Claims. (Cl. 178—69)

This invention relates to the timing of signals, particularly to determine whether or not the signals satisfy prescribed timing constraints.

A timing constraint is a restriction associated with the transition of a signal from one condition to another. Such a restriction may involve the duration of a condition, or, it may relate to the time limits within which the transition is scheduled to take place. With a pulse signal, for example, the condition can be one of amplitude, in which case a transition is represented by the change in amplitude that takes place either at the beginning or at the end of a pulse interval. Under many circumstances, as when signals are to be coordinated with each other, it is necessary that timing constraints be satisfied with precision.

Accordingly, it is an object of the invention to accomplish the precision timing of signals. A related object is to indicate the occurrences of timing failures occasioned by transitions that are either premature or excessively delayed. Another object is to determine whether or not transitions in pulse signals take place according to schedule. A still further object is to verify that the starting and terminating times of pulse signals lie within precisely established time limits.

It is a requirement of precision timing that a system for accomplishing the timing be fastacting. This does not mean, however, that a system for processing the signals, as opposed to timing them, must be similarly fastacting. As long as the delays introduced in processing bear a fixed relationship to each other, they are unobjectionable. Nevertheless, when timing is to be accomplished with precision, a relatively slowacting system for processing signals must be compatible with a relatively fastacting system for timing them.

For reasons of economy and reliability, signals subject to precise timing constraints are often processed by relatively slowacting relays. It is apparent that the latter cannot detect the precise moment of a timing failure within the interval required for a relay to operate. Nonetheless a relay can be used to register the fact that a timing failure has taken place.

Hence, it is a further object of the invention to determine the occurrences of timing failures by a timing system that is fully compatible with a system for processing signals. A still further object is to verify, in a relay system, the timing of signals with a precision exceeding that normally permitted by relay operation. A related object is to enable slowacting relays to register timing failures of signals that are subject to precise timing constraints.

In accomplishing the foregoing and related objects, the invention provides a fast-acting timing system which establishes timing intervals with a high degree of precision and yet is compatible with a relatively slowacting processing system. For each interval a timing device responds for a nominal timing duration that is extended in the event of a timing failure until slowacting components are able to react appropriately.

A suitable timing device is a fastacting monostable multivibrator which can be triggered to an unstable signal state that normally endures only for a timing interval. In the event of a timing failure the multivibrator is held in its unstable signal state until associated components are able to register the failure. Such a multivibrator employs two transistors which are normally in an "OFF" and in an "ON" condition, respectively. To initiate timing, the ON transistor is triggered to a discharge-controlled OFF condition. When a failure occurs, the discharge is clamped to a level preventing a return of the triggered transistor to its normally ON condition. As a result, relays used in conjunction with the multivibrator, and energized by it, are able to indicate the occurrence of a timing failure within closer limits than those ordinarily attending relay operation.

According to another aspect of the invention, a precise determination can be made that signals have effected a transition from one level to another within a first set of prescribed time limits and a return transition within a second set of prescribed time limits. For this purpose one timing device is used in establishing the minimum intervals associated with both sets of prescribed time limits and another, responsive to the first, is used in establishing their maximum intervals. When either device, during the course of timing, senses a timing failure, the timing interval is extended to allow relatively slowacting components to register the occurrence of the timing failure.

Specifically, for pulse signals each timing device is advantageously a transistorized multivibrator whose operation in an unstable state is continued beyond a nominal timing interval by the action of a threshold AND gate until the operation of one or more relays which register the occurrences of timing failures.

Other aspects of the invention will become apparent after the consideration of the several illustrative embodiments taken in conjunction with the drawings, in which:

FIG. 1A is a waveform diagram of a pulse signal whose duration is to be timed with precision;

FIG. 2A is a waveform diagram of a pulse signal whose starting and terminating times are to be determined with precision;

FIG. 3A is a waveform diagram of a pulse train subject to prescribed timing constraints;

FIGS. 3D and 3E are schematic diagrams of a controlled multivibrator for the timing system of FIGS. 3B and 3C.

Figure 1B:
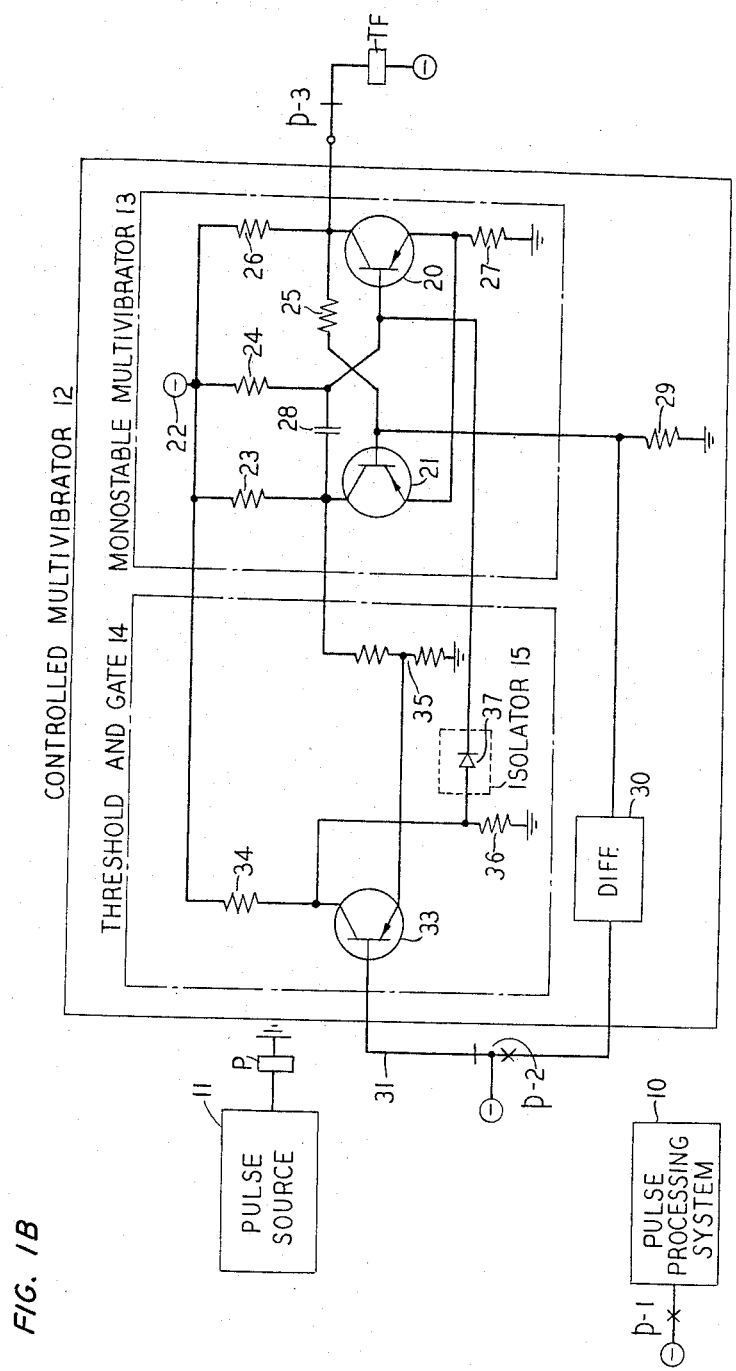
FIG. 1B is a block and schematic diagram of a system for timing the pulse signal in FIG. 1A.

Turning to FIGS. 1A and 1B, consider the precision timing of pulse duration for the signal of FIG. 1A. Such a signal is manifested in a pulse processing system 10 in FIG. 1B by the operation of a first set of relay contacts $p-1$ associated with a pulse relay P. After being energized by a source 11, at an initiating time $t_i$ (FIG. 1A) the relay operates after a delay $\delta_i$, typically 1.5 milliseconds, and gives rise to the pulse signal in the processing system 10. Once initiated, the pulse signal endures for a nominal duration T, which includes a short interval $\delta'$, typically 0.7 millisecond, beyond the time $t_f$ that the relay is deenergized.

To test the duration of the pulse signal with precision, while employing equipment that is compatible with relay operation, the invention provides for establishing the nominal pulse duration interval T with a fast-acting controlled-multivibrator 12 whose action is initiated by the closure of pulse relay contacts $p-2$ at the instant that the pulse signal is applied to the processing system 10. An indication of a premature termination of the pulse signal is provided by a timing failure relay TF at the output of the multivibrator 12. It is to be noted that the relay contacts are of two varieties: normally open, indicated by the intersection of a cross with a lead "✕" and normally closed, indicated by the intersection of a bar with a lead "+." When a normally open set of contacts is employed in conjunction with a normally closed set, the two sets form a transfer, e.g., p–2, which allows a signal to be selectively routed from one path to another.

An appropriate controlled-multivibrator 12 for the timing system of FIG. 1B is constituted of a monostable multivibrator 13, together with a threshold AND gate 14 that includes an isolator 15. In the context of the invention a multivibrator is a device that is capable of changing from one to another of a multiplicity of conditions. The condition may represent the current or voltage associated with any element, but it is typically an output voltage.

When a multivibrator is monostable, it has a single state of stable equilibrium and, in addition, at least one state of unstable equilibrium. As a result, the output of the multivibrator remains unchanged until it is triggered to its unstable state. The duration of the latter state is controlled by the discharge of an energy storage element, e.g., a capacitor. This discharge interval represents the nominal pulse duration T in FIG. 1A.

In the particular monostable multivibrator 12 of FIG. 1B, two transistors 20 and 21 are arranged with respect to a biasing source 22, various resistors 23 through 27 and a storage capacitor 28, so that the first transistor, i.e., the right-hand one, is normally ON and the second transistor, i.e., the left-hand one, is normally OFF. As a result, the output voltage of the monostable multivibrator is at the level developed across a low-impedance, common-emitter resistor 27, i.e., near ground. When a negative going trigger signal, developed at a resistor 29 by the action of a differentiator 30 after closure of contacts p–2, is applied to the base electrode of the second transistor 21, the transistor becomes conductive, so that its collector electrode is substantially at the ground potential level of the common-emitter resistor 27. This action back-biases the first transistor 20, causing it to be cut off by virtue of the charge stored earlier on the capacitor 28. Ordinarily, the capacitor would then begin to discharge and continue doing so until the first transistor 20 can no longer be maintained in an OFF condition, marking the end of the timing interval.

However, in accordance with the invention, if the pulse signal terminates before the timing interval, the multivibrator 13 is held in its unstable state until the timing failure relay TF is allowed to operate. This is accomplished by a negative polarity signal applied along a control path 31 to the input of a third transistor 33 in the threshold AND gate 14. The gate transistor 33 is connected to the source 22 through a resistor 34 and taps a resistor 35 connected to the collector electrode of the second transistor 21. Hence, when the monostable multivibrator is timing, the emitter electrode of the gate transistor 33 is near ground level. Consequently, a negative polarity signal is able to place the gate transistor in its ON condition with the result that the collector electrode of that transistor is also at approximately ground level, as determined by the voltage drop across a low resistance collector resistor 36. This causes the base electrode of the output transistor 20 in the monostable multivibrator 13 to be clamped at the collector resistor level below which the capacitor cannot discharge. As a result the multivibrator is unable to return to its initial signal state as long as the control signal is applied. Any attempt by the capacitor to discharge below the level of the collector resistor 36 would result in conduction through an isolating diode 37 that maintains the base voltage of the output transistor at the clamping level.

On the other hand, when the multivibrator is in its stable state, the signal on the control path 31 should be prevented from clamping the voltage at the base electrode of the output transistor 20. This is achieved by the voltage divider action of the tap resistor 35. When the multivibrator is not in its stable state, the collector electrode of its input transistor 21 is at an appreciably negative voltage level, so that the emitter electrode of the gate transistor 33 is likewise negative. If, under this condition, the tap of the divider resistor 35 is adjusted to make the voltage level at the emitter electrode of the gate transistor 33 more negative than the level at the base electrode, an applied control signal cannot interfere with the stable state of the multivibrator 13. In addition, when the multivibrator is timing and the capacitor is discharging, the gate 14 should not interfere with the discharge until a control signal is present. This necessitates isolation of the multivibrator from the gate by, for example, the diode 37, which is poled to prevent any premature termination of the discharge in the absence of a control signal.

If the pulse signal of FIG. 1A terminates prematurely, i.e., before the lapse of the nominal duration T, the break contacts p–2 and p–3 of the pulse relay P release to initiate holding action by the controlled-multivibrator 12 and engagement of the multivibrator with the timing failure relay TF. Thus, any departure, however slight, of the pulse signal from its nominal duration T in the processing system, is manifested by operation of the timing failure relay TF.

Even though the timing failure is indicated by a relay with an appreciable operating interval $\delta_2$, the holding action of the threshold AND gate 12 allows an indication of a premature termination of a signal within that interval. Were it not for the holding action, a premature release of the pulse relay within the interval $\delta_2$, indicative of a timing failure, would provide an insufficient duration for the operation of the timing failure relay before the return of the monostable multivibrator to its stable state at the end of the nominal timing duration T.

The timing system thus far considered can be readily adapted to the precision timing of starting and terminating time limits for a pulse signal of the kind shown in FIG. 2A. For the purpose of illustration, the starting and terminating times $t$ and $t'$ will be timed with respect to prescribed maximum and minimum time limits $t_{min}$, $t_{max}$ and $t'_{min}$, $t'_{max}$. Specifying the latter are four timing intervals A, B, C and D.

The first interval A will be taken as representing the duration required to ready processing equipment for the arrival of a pulse signal. Encompassed by the A interval is the duration from a reference time $t_{ref}$ to the minimum starting time $t_{min}$.

Once the processing equipment is ready, the pulse signal should arrive before the lapse of the second timing interval B which terminates at the maximum starting time $t_{max}$. Otherwise the equipment may be released to a pulse signal from another source.

After the pulse signal has arrived within prescribed starting time limits, it must endure sufficiently long for identification and, if necessary, for the extraction of information. As shown by the third timing interval C, the minimum terminating time $t'_{min}$ can be indicated in terms of minimum pulse duration.

Finally, the pulse signal should not continue beyond a maximum terminating time $t'_{max}$ specified with respect to the third timing interval C by the fourth timing interval D. Any extension of the pulse signal beyond the maximum terminating time could result in interpulse interference or otherwise reduce the rate at which pulse signals are applied to a processing system.

Figure 2B:
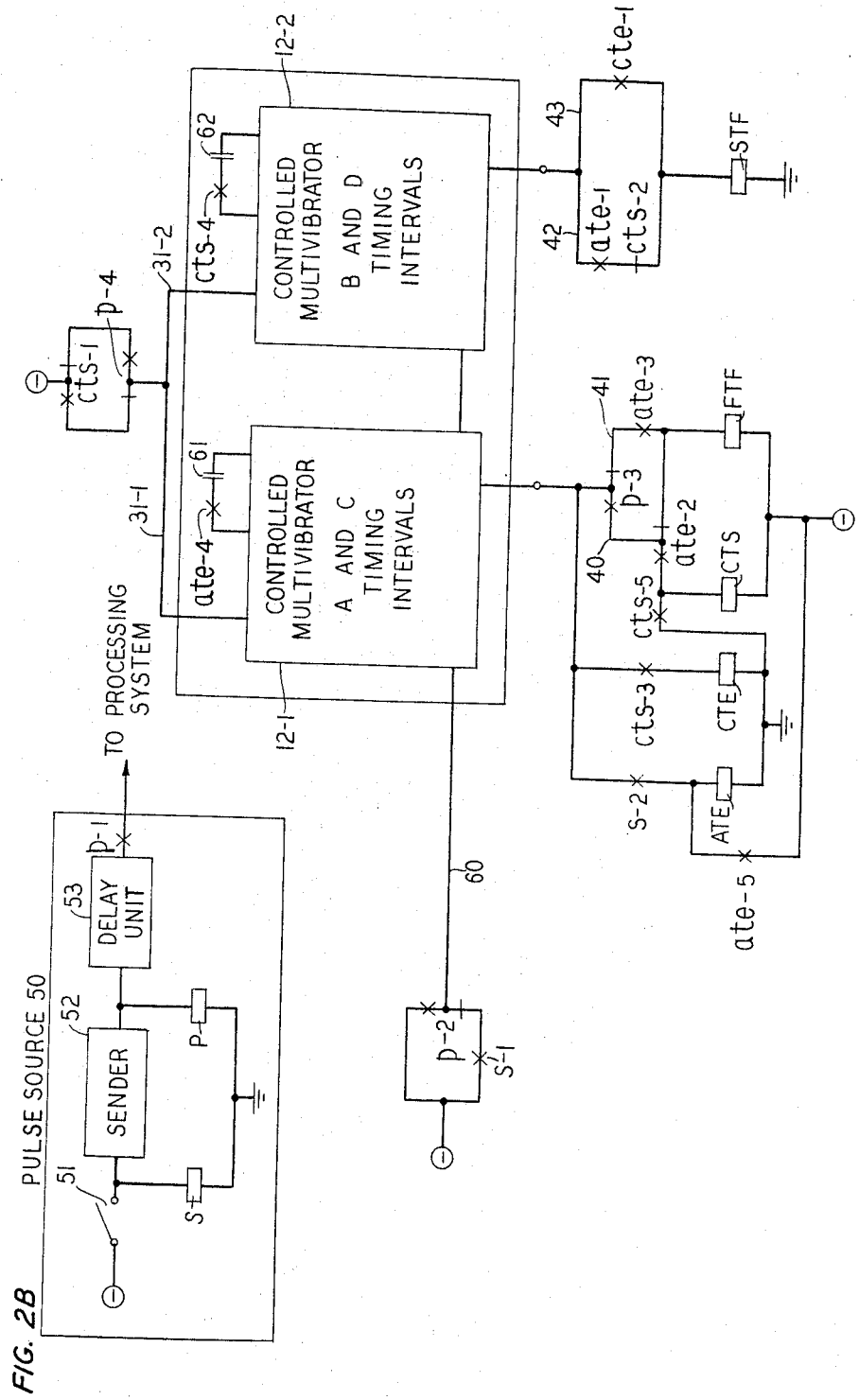
FIG. 2B is a block and schematic diagram of a system for the precision timing of the pulse signal in FIG. 2A.

As demonstrated by the system of FIG. 2B the invention provides for establishing the four timing intervals A, B, C and D by two fast acting controlled-multivibrators 12–1 and 12–2, each of the kind discussed in conjunction with the timing system of FIG. 1B. Although the controlled-multivibrators operate in conjunction with sloweracting relays, the system of FIG. 2B is able to achieve the precision timing of pulse signals originating at a source and intended for a processing system (not shown).

Since the timing system employs relays, it is directly compatible with relay processing equipment. In addition, by virtue of the coordination of fast acting multivibrators with slow acting relays, the timing system is able to establish whether or not the starting and terminating times of pulse signals occur within prescribed limits to a degree of accuracy within the operating times of the relays themselves.

As before, a negative polarity holding signal is applied to the control paths 31–1 and 31–2 of the individual multivibrators. Application of the holding signal is determined by the operation of two transfers cts–1 and p–4.

The first controlled-multivibrator 12–1 is used to establish the first and third timing intervals A and C, while the second multivibrator 12–2 is used for the remaining intervals B and D.

Indications of timing failures associated with the A and C intervals are provided by respective timing paths 40 and 41 extending from the output of the first multivibrator to a First Timing Failure relay FTF. For the B and D failures separate paths 42 and 43 extend from the output of the second multivibrator to a Second Timing Failure relay STF. In addition, the output of the first multivibrator is able, under the control of various sets of relay contacts, to energize relays ATE, CTS, and CTE which mark the limits of various timing intervals.

Since the multivibrators are fast acting, they are able to change rapidly from one condition to another, allowing the time limits to be established with precision. However, the relays associated with the multivibrators are relatively slow acting. Consequently, a change indicated by a multivibrator is not registered by the operation of an associated relay until after an appreciable delay. Nevertheless, through the application of a negative polarity holding signal through transfer contacts cts–3 and p–3, the invention provides a control mechanism by which the pulse signals can be timed with a precision exceeding that of the relays.

Timing is commenced by the closure, in a pulse source 50, of a switch 51 to activate a sender 52 which generates the pulse signals to be timed. Once the sender is activated, it should begin outpulsing at the end of the time required for the operation of a pulse relay P, included in the source 50 for the express purpose of monitoring the pulse signals generated by the sender 52. In order for the pulse relay to be operated at the precise instant that a pulse signal from the source is to be applied through contacts p–1 to a processing network (not shown), a delay unit 53 is inserted in the path extending from the sender to the processing network. The duration of the delay is adjusted to be approximately the same as the operate time of the pulse relay and can be made a portion of the A timing interval.

Besides allowing the sender to be energized, closure of the switch 51 energizes a start relay S. The latter closes a first set of contacts s–1 in a trigger path 60 of the first multivibrator. As a result, the trigger path is suddenly connected to a source of negative voltage through normally closed contacts of a pulse relay transfer p–2, giving rise to a transition of the multivibrator to its unstable signal state in the fashion described for the multivibrator of FIG. 1B and marking the commencement of the A timing interval. If the Pulse relay remains unenergized during the A timing interval, the first multivibrator 12–1 returns to its initial state without affecting the First Timing Failure relay FTF.

However, if the pulse relay is energized during the A interval, indicating the premature arrival of a pulse signal at the processing network, the First Timing Failure relay is energized from the A timing failure path 40 by the closure of normally open contacts in another transfer p–3 of the pulse relay. Under these conditions, the relay is able to indicate an A timing failure since the output of the first multivibrator is at ground level during the A timing interval. Of course, without the control mechanism provided by the invention, the Timing Failure relay would be unable to indicate a premature arrival of a pulse signal within an operating interval corresponding to the interval $\delta_2$ discussed in conjunction with the system of FIG. 1B.

To assure that a timing failure will be indicated with precision, even when the pulse signal arrives near the outer limit of the A interval, the state of the first multivibrator is held until the First Timing Failure relay is able to operate. This is done in a manner similar to that described in conjunction with that of FIG. 1B, by a holding signal applied to the control path 31–1 through the normally closed contacts of a transfer cts–1, as yet unenergized, and the contacts of the transfer p–4 that are closed by the action of the pulse signal.

If the pulse signal does not arrive before the end of the A timing interval, timing proceeds according to schedule and the A Timing End relay ATE becomes operated. The latter is held operated by the closure of contacts ate–5. It also closes a first set of contacts ate–1 in the B timing failure path 42 extending from the second multivibrator 12–2 to the Second Timing Failure relay STF. At the same time, the return transition of the first multivibrator 12–1 to its initial state produces a sudden voltage change which is converted by a differentiator, internal to the second controlled-multivibrator, into a pulse signal that triggers the multivibrator 12–2 into its unstable signal state, marking the commencement of the B timing interval. If no pulse signal appears at the processing network during this interval, contrary to requirement, the Second Timing Failure relay STF is energized at the end of the interval through previously closed contacts ate–1 and as yet, unbroken contacts cts–2 by the positive signal level at the output of the second multivibrator 12–2 upon its return transition to its initial signal state.

On the other hand, if the pulse signal appears as scheduled, the first multivibrator 12–1 is once again triggered by the closure of the normally open contacts of the pulse relay transfer p–2 in the trigger path 60. Simultaneously, the commencement of the C timing interval is indicated by a C Timing Start relay which is energized through transfers p–3 and ate–2. The latter relay operates a transfer cts–3 to open the control path 31 closed by the transfer p–4 of the pulse relay. The C Timing Start relay also closes contacts cts–4 in the output path containing the C Timing End relay CTE. If the pulse signal terminates before the lapse of the C interval, the First Timing Failure relay is energized through previously closed contacts ate–3 by the release of normally closed contacts of the transfer p–3 in the C timing failure path 41. To provide the desired holding action in the event of a premature termination of the pulse signal, the normally closed contacts of one transfer p–4 in the control path 31 are released and the normally open contacts of the other transfer cts–1 are engaged. If, however, the pulse continues beyond its minimum required duration, the C interval terminates as determined by the multivibrator time constant, which had been rendered appropriate for the C interval by the connection of a capacitor 61 into the time constant circuit of the first multivibrator 12–1 through the closure of contacts ate–4 at the end of the A timing interval.

Assuming that all is well, the pulse signal continues into the D interval, which is timed by the second multivibrator 12–2 for a period that is in part determined by a capacitor 62 connected into the time constant circuit of the second multivibrator through the closure of contacts cts–4 at the beginning of the C timing interval. When the pulse terminates, as it should during the D interval, a control signal is applied, in the fashion described for premature pulse termination during the C interval, to hold the timing state of the second multivibrator. As a result, the Second Timing Failure relay STF at the output of the second multivibrator is prevented from operating and giving a false indication of fault. On the other hand, should the pulse endure beyond its maximum D interval duration, no hold signal is applied to the second multivibrator 12–2 and the Second Timing Failure relay is activated through contacts *cte*–1 by the change in signal state which takes place at the end of the interval.

Thus, the pulse timing system shown in FIG. 2B allows verification that outpulsing by the sender 52 takes place only within critically defined timing limits. At the same time the system allows precision timing despite the fact that timing failures are indicated by slow acting relays.

Considering another aspect of the pulse timing, it is often desirable to check the constraints of signals forming a pulse train of the kind given in FIG. 3A. Such a train, in which an initial pulse signal is followed by two shorter duration pulse signals, occurs in the multifrequency pulsing of telephone messages.

In multifrequency pulsing the first signal of the train is known as a key pulse. It establishes appropriate connections for the dispatch of the multifrequency dial pulses which form the envelopes of various constant frequency tones that are combined on a two-out-of-five basis to represent the ten digits of the decimal system. To permit efficient transmission by time division multiplexing, the key pulse and the digit pulses should have durations and interpulse intervals that are confined within precise timing limits. Appropriate limits are established by eight distinctive timing intervals in FIG. 3A; four, A, B, C, and D, associated with the key pulse and akin to those of FIG. 2A, and four others, E, F, G, and H, associated with the digit pulses.

Figure 3B:
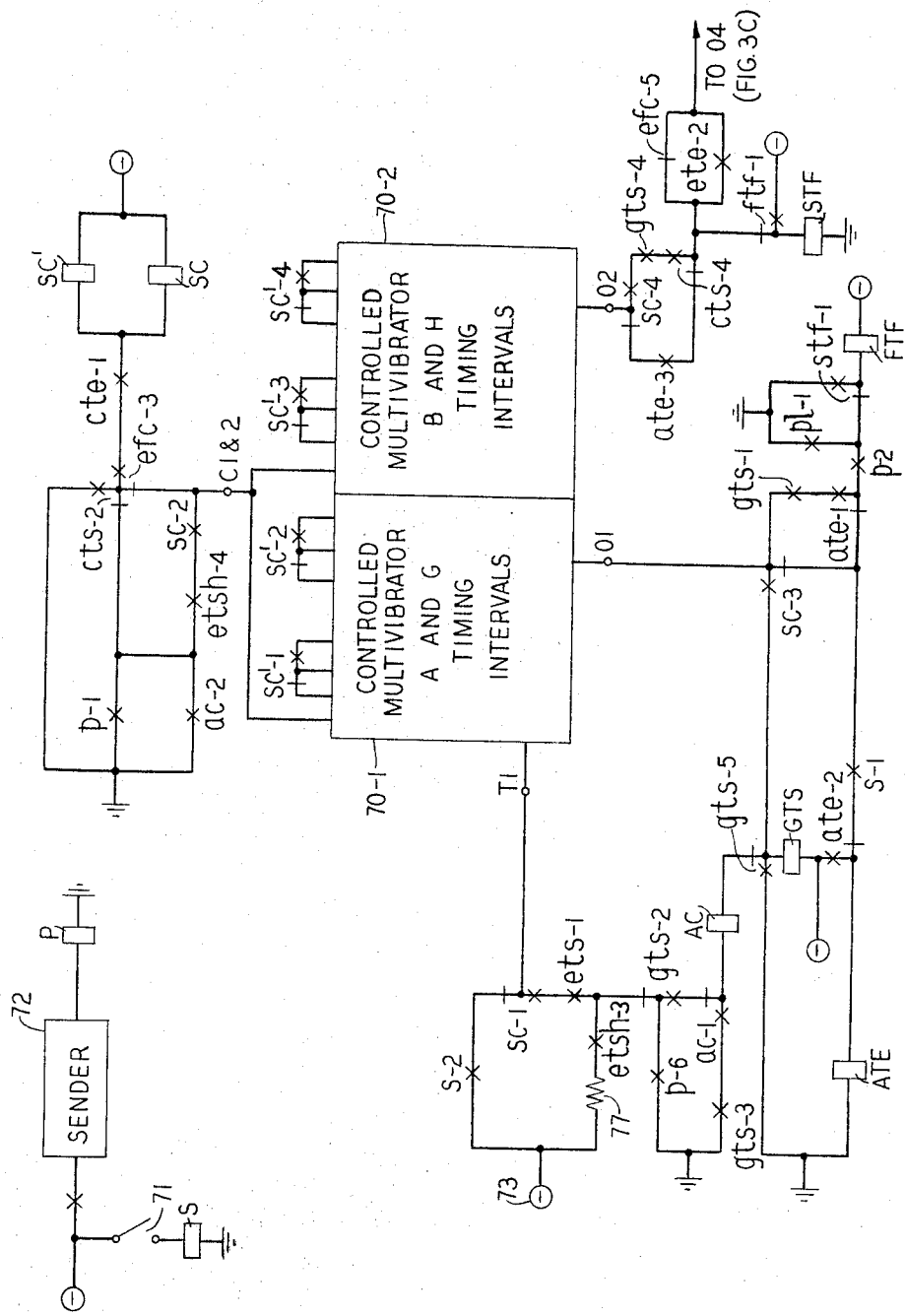
FIGS. 3B and 3C are block and schematic diagrams of a system for timing the pulse train of FIG. 3A.
Figure 3C:
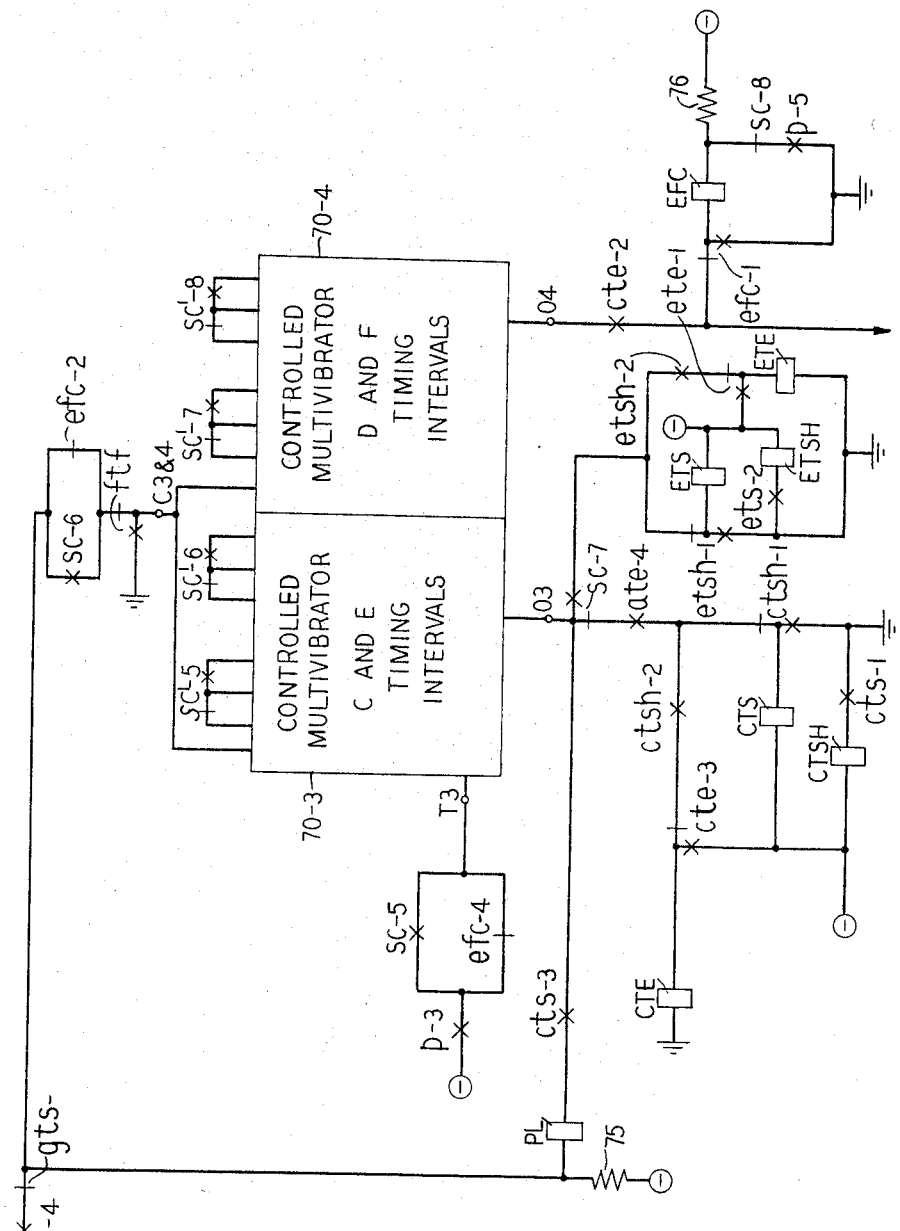

A determination that the pulse train is bounded within its timing intervals is made by the timing system of FIGS. 3B and 3C. Like the system of FIG. 2B, that of FIGS. 3B and 3C employs controlled-multivibrators 70–1 through 70–4, each similar to that discussed in conjunction with the system of FIG. 1B.

As before, each controlled-multivibrator establishes two timing intervals. However, instead of being for the same pulse, the intervals are for separate pulses. Specifically the first multivibrator 70–1 (FIG. 3B) times the A and G intervals in conjunction with an A Timing End relay ATE, a First Timing Failure relay FTF, a G Timing Start relay GTS, and a Pulse Check relay PC. The second multivibrator 70–2 times the B and H intervals in conjunction with a Second Timing Failure relay STF.

For the C and E intervals the third multivibrator 70–3 (FIG. 3C) operates a C Timing Start relay CTS, a C Timing Start Hold relay CTSH, a pulse length relay PL, an E Timing Start relay ETS, and E Timing Start Hold relay ETSH, and an E Timing End relay ETE. Finally, the D and F intervals are governed by the fourth multivibrator 70–4, along with an End of First Cycle relay EFC and a Second Timing Failure relay STF.

The first four intervals, A through D of FIG. 3A, constitute a first cycle and the remaining four, E through H, a second cycle. The multivibrators 70–1 through 70–4 are prepared for the second cycle by the action of an End of First Cycle relay EFC, a Second Cycle relay SC, and an auxiliary Second Cycle relay SC'—the latter two being operated from transfer contacts *efc*–3 of the End of First Cycle relay at the control terminal C1&2 of the first and second multivibrators.

At the commencement of timing, a switch 71 is closed to energize a start relay S which simultaneously activates a sender 72 through relay contacts *s*–1 and connects a source 73 of negative voltage through relay contacts *s*–2 to a start timing terminal T1 of the first multivibrator 70–1. As a result, the first multivibrator is internally triggered, in a manner to be described shortly, from a negative level at its output terminal O1 to approximately ground level.

If the sender 72 begins to outpulse prematurely, i.e., during the A timing interval, for example, within 59 milliseconds, a pulse relay P operates at its output. This extends the A timing interval by grounding a control terminal C1&2 of the first and second multivibrators through pulse relay contacts *p*–1. Except for being indirect, in a way that will be described subsequently, the control is similar to that used with the directly controlled-multivibrator of FIG. 2B.

At the same time that the A timing interval is extended, the Pulse relay P closes a path through its contacts *p*–2 from the output terminal O1 of the first multivibrator to a First Timing Failure relay FTF. When the latter operates, it can light lamps (not shown) which indicate an early pulsing failure.

If the sender operates properly, the A timing interval will expire and the output voltage of the first multivibrator will return to its preexisting negative level. This produces a signal which activates the second controlled-multivibrator 70–2 and causes the voltage level on its output lead O2 to change from a negative level to approximately ground level, marking the commencement of the B timing interval. In addition, the return of the first multivibrator to its initial condition operates the A Timing End relay ATE through closed contact *s*–3 of the start relay S at the end of the A timing interval, thus opening the path to the First Timing Failure relay by operating a transfer *ate*–1. The operation of another transfer *ate*–2 serves to hold the A Timing End relay ATE during the remainder of the test. Simultaneously, the A Timing End relay closes a path through another set of its contacts *ate*–3 from the output lead O2 of the second multivibrator to the Second Timing Failure relay STF.

Should the sender fail to outpulse during the B timing interval, for example, within 40 milliseconds, a rapid change from ground level to a negative signal level takes place on the second output lead O2. This operates the Second Timing Failure relay STF to block further testing and illuminate test lamps (not shown), indicating a late pulsing failure. If outpulsing begins during the B interval, the Pulse relay P will operate and stop the timing by grounding the control lead C1&2.

Operation of the Pulse relay P also applies a negative signal level through its contacts *p*–3 to the third multivibrator 70–3 (FIG. 3C) at its start timing lead T3 to start the C timing interval which is used to measure the minimum length of the key pulse, for example, 90 milliseconds. When this interval begins, a rapid change from a negative level to ground level takes place on the output lead O3 of the third multivibrator. This causes a C Timing Start relay CTS to operate through contacts *ate*–4 and a C Timing Start Holding relay CTSH to operate through contacts *cts*–1. The transfer *ctsh*–1 of the latter relay disengages the C Timing Start relay from the output terminal O3. With respect to the first two multivibrators 70–1 and 70–2 (FIG. 3B), the C Timing Start relay connects a ground to their control lead C1&2 through a transfer *cts*–2 to hold the multivibrators in a stop timing condition as the pulse relay releases. If the key pulse is less than 90 milliseconds, the pulse relay P will release before the C timing interval has expired. This removes a preexisting ground connection through relay contacts *p*–4 to a control lead C3&4 associated with the third and fourth multivibrators 70–3 and 70–4 and to a Pulse Length relay PL associated with the third multivibrator. As a result, the Pulse Length relay is energized from its source through relay contacts *cts*–3 because of the ground level condition on the output lead O3 of the third multivibrator, and the C timing interval is stopped due to the effective ground created at the control terminal side of an associated resistor 75. Then the Pulse Length relay operates the First Timing Failure relay through its contacts *pl*–1 to activate lamps (not shown), which indicate that the key pulse signal is of incorrect length.

If the key pulse signal endures as it should, the C timing interval will expire with a change from ground level to a negative signal level on the output lead O3 of the third multivibrator 70–3. Simultaneously the fourth multivibrator 70–4 undertakes a transition to its unstable state signifying the commencement of the D timing interval. At this time the output lead O3 of the third multivibrator 70–3, which now is at a negative signal level, operates a C Timing End relay CTE, which is held through its contacts cte–1, and closes the output terminal O4 of the fourth multivibrator 70–4 through other contacts cte–2 and p–5 to an End of First Cycle relay EFC. Simultaneously the fourth output lead O4 is connected to the Second Timing Failure relay through break contacts efc–1 of the End of First Cycle relay EFC. If the key pulse signal persists beyond the D timing interval, for example, beyond 20 milliseconds, the ensuing change of the fourth multivibrator 70–4 from ground level to a negative level operates the Second Timing Failure relay STF. If the key pulse ends before the termination of the D timing interval, the release of the Pulse relay P removes ground from the control terminal C3&4 of the third and fourth multivibrators 70–3 and 70–4 and allows completion of D timing without incident. The Pulse relay also unshunts the End of First Cycle relay, which then is operated from its source through its resistor 76 by virtue of the zero signal level at the output O4 of the fourth multivibrator 70–4.

Once operated, the End of First Cycle relay EFC disengages itself from the fourth multivibrator 70–4 and is held by the action of its transfer efc–1. At the same time the End of First Cycle relay prepares the system for timing the first digit pulse. It does this by opening the control leads of the multivibrators through the contacts efc–2 and through efc–3 to allow completion of any suspended timing intervals, e.g., the B and D interval. In addition, the End of First Cycle relay interrupts the path from the output O4 of the fourth multivibrator 70–4 (FIG. 3C) to the Second Timing Failure relay STF (FIG. 3B) through break contacts efc–5. It also removes the negative signal level from the start timing lead of the third multivibrator by breaking contacts efc–4 (FIG. 3C) and closes a path through the make contacts of transfer efc–3 (FIG. 3B to operate the two Second Cycle relays SC and SC'. The first of the latter removes the capacitors and resistors determining the time constant of the A, B, C, and D intervals and inserts alternative capacitors and resistors for the E, F, G, and H intervals by the actions of transfers sc'–1 through sc'–8. The various capacitors and resistors are considered further in conjunction with the controlled-multivibrator circuitry in FIG. 3C.

The other Second Cycle relay SC carries out eight functions. First, it transfers the start lead T1 of the first multivibrator from make contacts of the Start relay to make contacts ets–1 of an E Timing Start relay ETS through transfer sc–1. Second, it recloses the control lead C1&2 to make contacts etsh–1 and p–1 on an E Timing Start Holding relay ETSH and the Pulse relay through transfer sc–2. Third, the output lead O1 of the first multivibrator is transferred by a transfer sc–3 from the A Timing End relay to the G Timing Start relay and its associated circuitry. Fourth, the output lead O2 of the second multivibrator is transferred by a transfer sc–4 to cope with the H timing interval. Fifth, the start lead T3 of the third multivibrator is reclosed by contacts sc–5 to initiate the E timing interval. Sixth, the control lead C3&4 for the third and fourth multivibrators is reclosed through contacts sc–6 to its original ground connection through the contacts of the Pulse relay. Seventh, the output lead O3 of the third multivibrator is transferred by a transfer sc–7 to relays associated with the E timing interval. And finally, eighth, the output lead O4 of the fourth multivibrator is readied through contacts sc–8 for the F timing interval.

When the sender begins to outpulse the first digit pulse at the start of the E timing interval, the Pulse relay connects a negative voltage to the start timing lead T3 of the third multivibrator through contacts P–3 to initiate the E interval which should endue for 50 milliseconds. This represents the minimum closure for the dial pulse signal. The relays associated with the E interval function as described for the minimum closure of a key pulse signal, except that E Timing Start relay ETS is substituted for C Timing Start relay, etc. If a failure occurs in this interval, the First Timing Failure relay FTF will respond appropriately because of the operation of the Pulse length relay PL.

The start of the F interval, normally 10 milliseconds, is initiated in the same way as the maximum interval for the key pulse. If the F interval closure is of incorrect length, the Second Timing Failure relay will respond through contacts ete–2.

Otherwise, the digit pulse terminates, through the ground from the start lead T1 of the first multivibrator 70–1 by the breaking of contacts p–6 and applying a negative signal level to the multivibrator from the starting source 73 through an associated resistor 77. This results in an imediate transition from a negative level to ground level on the output lead O1 of the first multivibrator, causing the G Timing Start relay GTS to operate and indicating the commencement of the G timing interval, for example, 50 milliseconds. If the next digit pulse begins before the expiration of the G interval, the operation of the Pulse relay closes a path from the output lead O1 to the First Timing Failure relay through contacts gts–1. If pulsing does not start, the G interval will expire, causing the first multivibrator to return to its initial negative signal level and to initiate operation of an Auxiliary Check relay AC, the response of which through a transfer ac–1 and relay contacts gts–3 is delayed for at least 10.5 milliseconds. At the same time the H timing interval is initiated for 10 milliseconds. If pulsing does not begin, the H interval will expire and operate the Second Timing Failure relay through contacts gts–4. If the digit pulse is in time, operation of the Pulse relay connects ground to the control lead C1&2 and prevents operation of the Second Timing Failure relay. Further, the delayed operation of the Auxiliary Check relay AC results in the imposition of an auxiliary ground through contact ac–2 to hold the H interval in its stop timing condition after the pulse relay releases.

The Auxiliary Control relay AC is also able to close a path (not shown) to disengage the timing system until further timing is desired.

The controlled-multivibrators 70–1 through 70–4 of the system in FIGS. 3B and 3C are advantageously of the kind shown in FIGS. 3D and 3E. As before, a monostable multivibrator 13 is employed in conjunction with a threshold AND gate 14'. However, the latter includes a buffer transistor 38 and associated components 38a through c for isolating it from the monostable multivibrator 13. In addition, there are matching and threshold networks 80 and 82 (FIG. 3E) to facilitate relay operation and to prevent undue loading at the output OA.

When the control signal is applied by grounding the control terminal C1 (FIG. 3D), as in FIG. 3B, the controlled-multivibrator employs an inverter 84, which may be a normally ON transistor 84–a and associated resistors 84–b through e that is turned OFF through completion of a bias path 84–g including a resistor 84–j and a diode 84–k extending from the base electrode of the transistor 84–a to the monostable multivibrator 13.

The matching network 80 provides a desired impedance transformation using an emitter follower transistor 80–a. It is connected by resistors 80–e and f from the monostable multivibrator transistor 82–a of the threshold network 82. An isolating resistor 82–c of appreciable resistive magnitude in the latter is used to prevent loading of the transistor 80–a. Since the isolating resistor is of appreciable resistive magnitude, a substantial voltage is developed across it due to collector saturation current in threshold network 82. However, the adverse effects of the saturation current are prevented by an isolating diode 82–*e* connected between the base electrode of the threshold transistor and one terminal of the isolating resistor. As a result, the collector saturation current of the threshold transistor is prevented from forward biasing its emitter-base region and causing it to operate prematurely. To remove output noise effects, the threshold network has a cutoff device, desirably a Zener diode 82–*g*, in the path including its base electrode.

Two power supplies 86 and 88 are used to maintain desired voltage regulation. The first is filtered and given an improved noise characteristic by being shunted with a capacitor 86–*a* and the combination of a diode 86–*b* and a resistor 86–*c*. Its source 86–*d* supplies the threshold network 82 through resistors 86–*e* and 82–*g* and the emitter electrode of the transistor 80–*a* in the matching network 82 through resistors 80–*b* through *d*. The other power supply 88, similarly filtered by components not shown, supplies a common bus 88–*a* for the inverter 84, the threshold gate 14′, the monostable multivibrator 13 and the matching network 80.

As with the controlled-multivibrator of FIG. 1B, that in FIG. 4 a differentiator 30 is used to convert a suddenly applied negative voltage level into a trigger signal that is able to produce a timing transition of the monostable multivibrator to its unstable state. The differentiator is of conventional variety with resistors 30–*a* through *c*, a capacitor 30–*f* and an output diode 30–*h* for the purpose of limiting noise effects.

Generally, the controlled-multivibrator of FIGS. 3D and 3E operates in a fashion similar to that previously described for the multivibrator of FIG. 1B. When a sudden, negative-going transition is applied to the differentiator 30, the left-hand transistor 21 of the monostable multivibrator 13 is turned on, and the multivibrator assumes a state of unstable equilibrium which endures for a discharge-controlled interval. The precise length of the interval depends upon the auxiliary Second Cycle relay SC′ of FIG. 3B. When the relay is unenergized, the discharge depends upon a first capacitor 28 and a first resistor 24. An alternative capacitor 28′ and an additional resistor 24′ are switched into operation when the relay is energized to change the discharge interval.

As noted earlier, although the inverter transistor 84–*d* is initially ON, it is turned OFF by the sudden negative signal level applied through the biasing path 84–*c* when the control terminal C1 is grounded. If the monostable multivibrator 13 is simultaneously in a timing condition, so that the emitter electrode of the gate transistor 33 is at substantially ground level, the threshold AND gate 14′ will operate and turn OFF the buffer transistor 38. Thereafter, the voltage developed across a buffer load resistor 36 maintains the base electrode of the right-hand transistor 20 of the monostable multivibrator at substantially ground level, thus preventing the right-hand transistor from being turned ON until the release of the ground connection at the control terminal C1.

So long as the right-hand transistor of the monostable multivibrator is OFF, its output is more negative than the bias level developed across the emitter resistor of the emiter follower transistor 80–*a* (FIG. 3E), it is able to override the emitter bias level and place the transistor in its conduction condition, making the input level to the threshold network 82 greater than its preestablished cut-off level. Hence, the threshold transistor 82–*a* is also placed in its conduction condition and the over-all output of the controlled multivibrator consequently has changed from an appreciably negative level to substantially ground level as required to mark the commencement of a timing interval.

Other adaptations of the invention will occur to those skilled in the art.

What is claimed:
1. Apparatus which comprises
a monostable multivibrator comprising
first and second transistors, each having emitter, base, and collector electrodes,
a source of supply potential,
a first resistor interconnecting said source jointly with the emitter electrodes of said first and second transistors,
a capacitor interconnecting the collector electrode of the second transistor with the base electrode of the first transistor,
a third resistor interconnecting said capacitor with said source,
a second resistor interconnecting the collector electrode of said first transistor with the base electrode of said second transistor,
collector resistors interconnecting the collector electrodes of said transistors with said source of biasing potential,
a threshold AND gate comprising
a third transistor having emitter, base, and collector electrodes,
a fourth resistor interconnecting the collector electrode of said third transistor with said source,
a fifth resistor interconnecting the collector electrode of said third transistor with said first resistor,
and a sixth resistor with a tap extending to the emitter electrode of said third transistor and interconnecting the collector electrode of said second transistor with said fifth resistor,
a diode interconnecting said fifth resistor with the base electrode of said first transistor,
means for applying a trigger signal to said second transistor,
whereby said trigger signal causes said multivibrator to effect a change of state for a time interval partly determined by the capacitance of said capacitor, which time interval is extended whenever a control signal is applied to the base electrode of said third transistor.

2. A controlled-multivibrator comprising
a monostable multivibrator,
an indicating device coupled to the output of said monostable multivibrator,
an AND gate coupled to said monostable multivibrator, whereby an input to said AND gate of magnitude greater than that at the input of said monostable multivibrator produces a change in condition of said AND gate,
means for applying said changed condition at the output of said monostable multivibrator, and
means for triggering said monostable multivibrator to an alternative signal state,
whereby an input to said AND gate, when said monostable multivibrator is triggered to its unstable state, produces said condition and prevents a return of said multivibrator to its stable state.

3. Apparatus for determining that a signal effects a transition from one level to another within a first set of prescribed time limits and a return transition within a second set of prescribed time limits which comprises:
a first timing device for establishing the minimum intervals associated with both sets of prescribed time limits,
a second timing device, responsive to the first, for establishing the maximum intervals associated with said sets,
means for extending said intervals for the failures of the signal to satisfy said limits during the course of timing,
thereby to allow the registration of said failures after the nominal termination of said intervals.

4. Apparatus for timing a pulse train commencing with a first signal whose starting and terminating times are to lie within a first set of prescribed limits and followed by two other signals whose terminating and starting times are to lie within a second set of prescribed limits, which apparatus comprises
a first controlled-multivibrator for establishing A and G intervals during which respective first and third pulse signals must not appear,
a second controlled-multivibrator, responsive to the first, for establishing B and H intervals, measured with respect to said A and G intervals, during which the leading edges of said first and third pulse signals must appear,
a third controlled-multivibrator for establishing C and E intervals representing the respective minimum durations of the first and second pulse signals,
a fourth controlled-multivibrator, responsive to the third, for establishing D and F intervals, respectively, measured with respect to said C and E intervals, during which said first and second pulse signals must terminate,
means for initiating the A timing interval of said first multivibrator,
means responsive to said first and second pulse signals for respectively initiating said C and E intervals, and
means responsive to said second pulse signal for initiating the G timing interval of said first multivibrator.

5. In combination with a monostable multivibrator having two active elements in alternative signal states which are interchanged for a preassigned duration by a trigger signal,
apparatus for extending the duration of the interchange, which comprises
a third active element,
means, responsive to a control signal, for altering the activity of third active element when said two active elements have interchanged their signal states,
means, responsive to the altered condition of said third active element for clamping one of said two active elements at a preassigned signal level determined by said altered condition, thereby to prevent a termination of said interchange for the duration of said control signal.

6. In combination with a monostable multivibrator which is triggerable to an unstable condition for a duration determined by the discharge of an energy storage element,
a threshold AND gate comprising
means for detecting that the monostable multivibrator is in its unstable condition,
a switching element,
means for activating said switching element in response to a control signal when said monostable multivibrator is in its unstable condition, and
means, responsive to the activated switching element, for clamping said energy storage element to a signal level below which it cannot discharge,
thereby to maintain said monostable multivibrator in its unstable condition during the activation of said switching element.

7. In combination with a monostable multivibrator having two active elements and a supply signal source,
apparatus for altering the stability of said multivibrator, which comprises a third active element having a first electrode, a second electrode connected to the source, and a third electrode connected to one of the two active elements,
whereby a signal level at said first electrode exceeds that at said third electrode produces a change in signal level at said second electrode, and
means, responsive to said change in signal level, for applying a fixed signal level to the other of said two active elements,
thereby to render the multivibrator bistable as long as the signal level at said first electrode exceeds that at said second electrode.

8. In combination with a monostable multivibrator having two active elements supplied by a source connected to a point of common potential,
apparatus for controlling the multivibrator, which comprises
a resistor interconnecting one of the elements with said point of common potential,
a transistor having an emitter base and collector electrodes, the emitter electrode tapping said resistor and the collector electrode being connected to the source,
whereby a voltage at base electrode exceeding that at the emitter electrode produces a change in the voltage level at said collector electrode, and
means interconnecting the collector electrode with the other of said active elements for fixing the voltage of the latter in response to the change in voltage level at said collector electrode.

9. Apparatus as defined in claim 8 wherein said voltage fixing means comprises a buffer transistor having collector and emitter electrodes interconnecting said source with said other active element, and a base electrode connected to the collector electrode of the first-mentioned transistor,
whereby said change in collector voltage level renders said buffer transistor nonconductive and applies a fixed voltage level near that of said ground potential common point to said other active element.

10. Apparatus as defined in claim 9 further including means for isolating said buffer transistor from said other active element.

11. Apparatus as defined in claim 10 where said isolating means comprises a unilateral conducting device interconnecting the emitter electrode of said buffer transistor with said other active element.

References Cited by the Examiner

UNITED STATES PATENTS 2,619,542 11/1952 Carver _____ 178—69
2,822,538 2/1958 Trevor _____ 328—207
2,938,168 5/1960 Kreuder _____ 328—207
3,214,602 10/1965 Heyning et al. _____ 328—207

NEIL C. READ, *Primary Examiner.*

T. A. ROBINSON, *Assistant Examiner.*